MARCELLUS N. GILBERT JR.
ROBERT E. CLEVELAND
INVENTORS

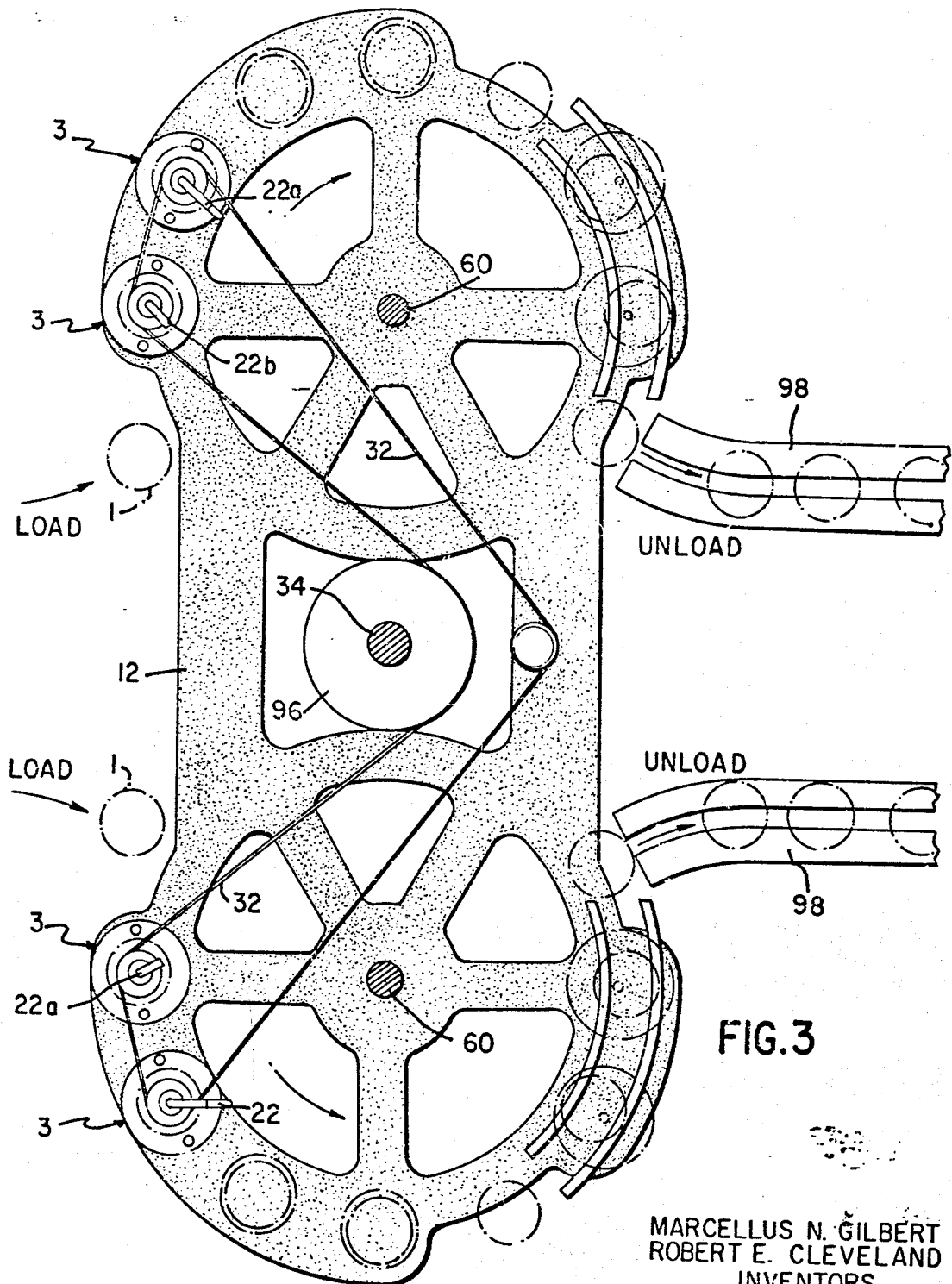

United States Patent Office 3,510,667
Patented May 5, 1970

3,510,667
INSPECTION APPARATUS COMPRISING ROTATABLE AND RECIPROCABLE LIGHT-TRANSMITTING FIBER BUNDLE
Robert E. Cleveland, Danvers, and Marcellus N. Gilbert, Jr., Lynnfield, Mass., assignors to Sylvania Electric Products Inc., a corporation of Delaware
Filed June 23, 1967, Ser. No. 648,425
Int. Cl. G02b 5/14; B07c 5/342
U.S. Cl. 250—227
1 Claim

ABSTRACT OF THE DISCLOSURE

A method of and apparatus for inspecting articles of work by means of a fiber optic device in which a rotating fiber optic bundle scans a stationary article of work.

---

This invention relates to article inspection techniques and more particularly to a method of and apparatus for inspecting articles of work by means of a fiber optic device.

In the manufacture of practically every article sold in commerce today there are usually at least several inspections thereof during the course of manufacturing as well as upon completion thereof. Sometimes this inspection is effected visually by an operator or inspector and other times it is done automatically by means of some electrical or mechanical device. In most instances the best of both techniques are employed, depending upon the nature of the article and its environment during any given inspection.

In addition to the foregoing, there are other major considerations. For example, mass production articles manufactured on thigh speed, fully automated machinery which should be inspected at various stages of production present a significant problem. In order not to have a substantial adverse effect on production speeds, inspection techniques should be designed so that the actual inspection can be effected quickly, accurately and with a minimum of interference with the orderly flow of the articles of work through the production line. Sometimes this circumstance or condition is not easily or readily attainable.

Over the years many different electrical, mechanical and electromechanical devices have been designed and used in the inspection of various articles of work. More recently the principles of fiber optics have found application in the fields of quality control and article inspection.

In the simplest of these applications, a pair of stationary fiber optic light-transmitting cables are usually used to detect the presence or absence of something at a particular locus, with the article of work also being stationary at the moment of inspection. One end of one of these cables is connected to a light source and one end of the other cable is connected to a detecting device such as a photocel. The other ends of these cables are located in cooperative relationship with respect to one another and with respect to the article of work to be inspected so that light from one of the cables will be reflected off of the article of work and into the outer cable to impress a signal on the detecting device.

In other applications, where a surface is to be scanned, there must be some relative motion between the article being inspected and the fiber optic device. In high speed production operations there are significant practical problems in the application of fiber optic techniques. If the article is rotated, chucking and rotating mechanisms must be provided. While this arrangement may not be too expensive or impractical in cases where the article of work is quite uniform and regular in shape, it is quite expensive, and impractical with irregular pieces or articles of work. If the article is held stationary then the light source and photocell are usually mounted on a rotating member with some form of slip-ring assembly associated therewith in order to obtain electrical commutation therefrom. This arrangement has its disadvantages, not the least of which are contact wear and noise generation associated with the slip-ring assembly. In addition, of course, there are always problems created by the location of inspection equipment of any great bulk or size immediately adjacent to a high speed production machine.

In view of the foregoing, one of the principal objects of this invention is to provide for the high speed inspection of articles held stationary momentarily for this purpose during manufacturing on high speed equipment.

Another object is to provide a fiber optic device capable of making such an inspection in such an application.

These and other objects, advantages and features are attained, in accordance with the principles of this invention, by a fiber optic device having a rotating fiber optic cable and a nonrotating fiber optic cable, the adjacent ends of which are aligned to provide for communication of light therebetween. The bundles of fibers in these cables are randomly arranged and are sometimes referred to as "incoherent," as distinguished from "coherent" bundles which transmit an image and in which the fibers are systematically arranged. The nonrotating fiber optic cable is bifurcated, one leg thereof transmitting light from a light source to the rotating cable and the other leg thereof receiving reflected light from the rotating cable. Thus the rotating cable transmits and receives simultaneously.

In the specific embodiment of the invention illustrated in the accompanying drawings:

FIG. 3 is a transverse sectional view of the article inspection apparatus taken along the line 3—3 of FIG. 2.

Figure 1:
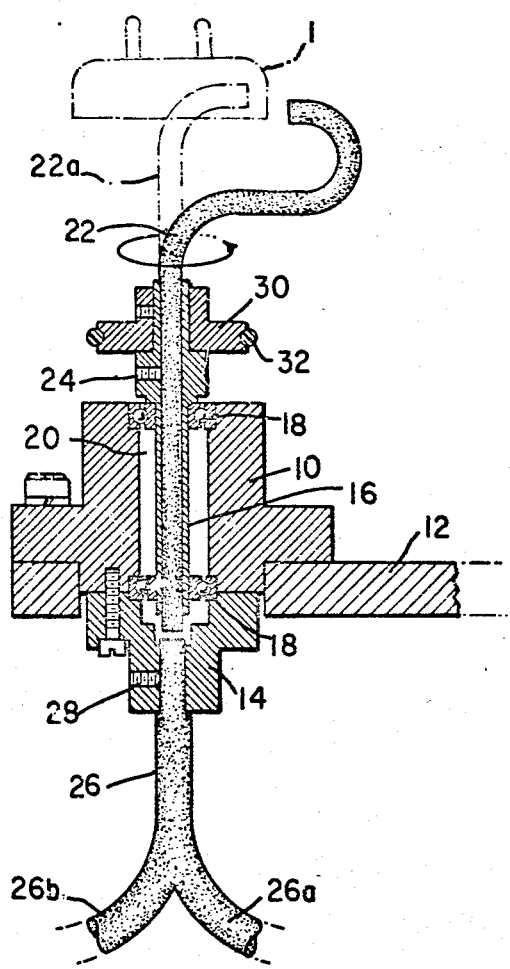
FIG. 1 is a sectional elevational detail on an enlarged scale of a fiber optic device embodying the principles of this invention.

A detail of a specific embodiment of the fiber optic device of this invention is illustrated in FIG. 1. As shown therein the device comprises a housing 10 fitted in an aperture provided therefor and secured to a lower plate 12, a cap 14 fitted into the aforesaid aperture from the underside of the plate 12 and secured to housing 10, and a metal sleeve 16 set in ball bearings 18 in the bore 20 of housing 10. A stainless steel tube 22 containing a bundle of incoherent glass fibers is fitted in the sleeve 16 and secured in position by screw 24. The tube 22 is shaped so that the exposed end thereof will be oriented accurately with respect to the article to be inspected, such as a fluorescent lamp base 1 of the bi-pin type for example. Tube 22 is arranged for inspection of the exterior wall of the base whereas tube 22a, shown in phantom, is shaped to inspect the interior wall of the base. Thus a tube like tube 22 would be a component of a fiber optic device at one inspection station whereas tube 22a would be a component of a fiber optic device at another inspection station.

Aligned with the inner end of the fiber optic tube 22 is the common end of a bifurcated fiber optic cable 26, provided with incoherent fibers, which is fitted in a bore provided therefore in cap 14 and secured to said cap by screw 28. Leg $a$ of the cable 26 runs to a light source and leg $b$ runs to a photocell. The bifurcated fiber optic cable 26 is secured to the cap 14 and thus is nonrotatable, whereas the tube 22 of glass fibers is rotatable with the sleeve 16 by pulley 30 secured to the sleeve and drive belt 32.

Light from a light source is transmitted through leg $a$ of the bifurcated cable 26 and through the common segment thereof, commutated across the gap between adjacent ends of cable 26 and fiber optic tube 22, and transmitted by rotating tube 22 to the face of the article being inspected. Reflected light from the article being inspected is carried back through the same path as aforesaid except that the reflected light exists through leg b of cable 26 to a photocell. Thus the incoherent glass fibers in rotating tube 22 transmit and receive simultaneously, commutation in both directions is effected across the gap between members 22 and 26, the common segment of the bifurcated cable 26 transmits and receives, leg a thereof transmits and leg b receives.

In the mechanization of the fiber optic device of FIG. 1 and the adaptation thereof to mass production and inspection equipment, it will be apparent from the foregoing description of the FIG. 1 fiber optic device that means must be provided to rotate the inspection segment thereof around the article of work and reciprocate it into and out of proximity thereto. If several inspections are to be made by several inspecting devices simultaneously, then some form of turret with means to index it must also be provided. And finally, means must be provided to open and close the jaws which hold the articles of work. These mechanisms are shown in FIG. 2.

Figure 2:
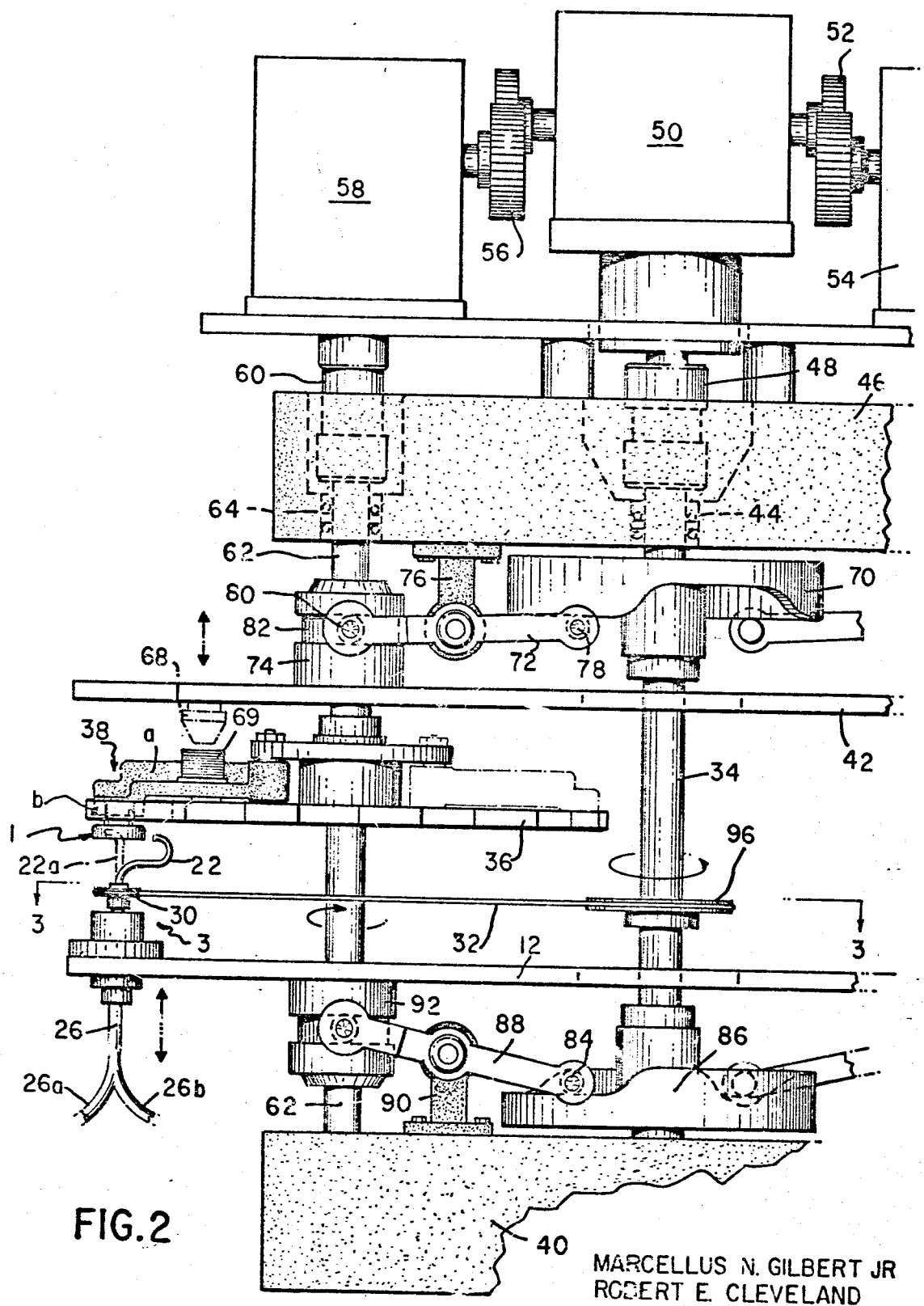
FIG. 2 is a side elevational view of a segment of an article inspection apparatus employing the fiber optic device of FIG. 1.

The several mechanisms illustrated in FIG. 2 are organized about a drive shaft 34 which is arranged to drive twin indexing tables 36 (one of which is shown), each of which has a plurality of article holding devices 38 arranged radially thereon. The drive shaft 34, driven by a motor not shown is supported at one end thereof in a bottom deck support casting 40. The drive shaft 34 extends freely through openings provided therefor in lower plate 12 and upper plate 42. The other end of drive shaft 34 is supported in ball bearings 44 in an upper deck support casting 46. Coupling 48 connects this end of the drive shaft 34 to a miter gear box 50. Gear train 52 connects the miter gear box 50 to an index drive 54. A similar gear train 56 connects the miter gear box 50 to a similar index drive 58. Only a fragmentary portion of index drive 54 is shown and none of the mechanisms connected thereto are shown because the arrangement is the same as the structure associated with index drive 58 described in detail below.

Index drive 58 is connected through coupling 60 to one end of an indexing shaft 62 supported in ball bearings 64 in the upper deck support casting 46. The other end of the indexing shaft 62 is rotatably supported in the bottom deck support casting 40. Indexing table 36 is fixedly attached to the index shaft 62 so that the several article holding devices 38 disposed radially thereon are intermittently advanced to present the articles held thereby to certain inspection devices, such as the fiber optic device 3 of this invention for example. The indexing table 36, as viewed in elevation in FIG. 2, is located between lower plate 12, on which inspection devices such as fiber optic device 3 is mounted, and upper plate 42 from which a jaw opener 68 depends. As noted above, indexing table 36 is secured to the index shaft, whereas the upper and lower plates 42 and 12 are free with respect thereto.

Means are provided for effecting periodic reciprocation of the upper and lower plates 42 and 12. Reciprocation of the lower plate 12 moves the fiber optic device 3 mounted thereon into and out of operative relationship with respect to the article of work, the fluorescent lamp base 1, held in the jaws of the article holding device 38. Reciprocation of the upper plate 42 moves the jaw opener 68 depending therefrom into and out of operative relationship with respect to the jaws of the article holding device 38.

Reciprocation of upper plate 42 is effected by face cam 70 on drive shaft 34 through a yoke 72 to a bearing housing 74 which is mounted on the upper plate 42. The yoke 72 is a bifurcated member pivotally supported intermediate its ends in a bracket 76 secured to and depending from the upper deck support casting 46. A cam roll 78, located on the common end of yoke 72, rides on the face cam 70. Cam rolls 80 on the bifurcated ends of yoke 72 fit in a channel 82 provided therefor in the bearing housing 74. Thus the changes in elevation of the cam roll 78 riding along the rises and falls of the face cam 70 are transmitted through the yoke 72 to the bearing housing 74 and the upper plate 42 on which it is mounted.

A similar arrangement is provided to effect reciprocation of lower plate 12. Changes in elevation of a cam roll 84 riding along the rises and falls of a face cam 86 on drive shaft 34 are transmitted through a bifurcated yoke 88, pivotally mounted intermediate its ends in a bracket 90, to a bearing housing 92 secured to the underside of lower plate 12.

As shown in FIG. 2, the cam roll 84 is riding on the low portion of the cam 86 and thus the lower plate 12 has been elevated to place the fiber optic device 3 and more particularly the fiber optic tube 22 thereof (or when an inner surface is to be inspected the fiber optic tube 22a) in operative relationship with respect to the fluorescent lamp base 1 held by a jaw a of the article holding device 38 and jaw b of the indexing table 36. Rotation of the fiber optic tube 22 for inspection of the base 3 is effected by drive belt 32 which connects the drive shaft 34 to pulley 30 of the fiber optic device through pulley 96 on the drive shaft 34. After inspection has been effected, the cam roll 84 will be riding on the high side of the cam 86 and thus lower the lower plate 12 to a point where it is clear of the inspected article. The table 36 is then indexed by the index drive 58 and the index shaft 62 to which the table 36 is secured to thus bring another article of work held by another article holding device 38 into position to be inspected by the fiber optic device 3.

At an unloading station the inspected base 1 is discharged from the article holding device 38. At the unloading station the upper plate 42 has a jaw opener 68, in the form of a tapered plug, depending therefrom and in register with inclined shoe 69 on the article holding device 38. The inclined shoes 69 define a chamber to receive the plug-like jaw opener and the walls thereof define a camming surface for said jaw opener. The jaw opener 68 is shown in phantom in FIG. 2 because FIG. 2 shows an inspection station and, as noted above, the jaw opener is located at an unloading station subsequent thereto. At the unloading station, cam roll 78 will be riding on the low side of the cam 70 and thus the upper plate 42 will be caused to move downwardly and effect insertion of jaw opener 68 into the chamber defined by inclined shoes 69 and thus cam open the jaws a and b and release the base 1.

In the introductory paragraph of the description of FIG. 2 above, it was noted that twin indexing tables 36, on each of which are mounted a plurality of article or work supporting devices 38, are driven by a drive shaft 34. It was also noted that the apparatus located to the right of the main drive shaft 34 in FIG. 2, although not shown, is the same as the apparatus located to the left thereof and has been described in detail. FIG. 3 is a plan view taken along the line 3—3 of FIG. 2 but extending over to include the associated twin mechanism to show the overall arrangement. As shown in FIG. 3, the lower plate 12 comprises a pair of disk-like members defining a turret-type arrangement but connected to one another to define a unitary member. An index shaft 60 extends through the central portion of each of the disk-like members, one of said shafts being connected to the index drive 54 and the other to the index drive 58 (FIG. 2) as noted above. Each of the disk-like members of the lower plate 12 has a plurality of article inspection devices mounted thereon, a pair of fiber optic devices 3 being shown in solid and several other types of inspection devices being shown in phantom. One of the fiber optic devices is shown with a fiber optic tube 22 for inspecting the exterior face of a lamp base 1 whereas the other fiber optic device is shown with a fiber optic tube 22a for inspecting the interior face of a lamp base 1.

The flow of the work is illustrated in FIG. 3. Lamp bases are fed into the machine at the left and each base is received by one of the several article holding devices mounted radially on an indexing table 36 (FIG. 2) and then advanced sequentially into position to be inspected by the fiber optic devices 3 and the other inspection devices. When all inspections have been completed, the lamp bases are then discharged onto a guide track 98.

We claim:

1. Article inspection apparatus comprising: a table; a plurality of article-holding devices mounted on said table; means for indexing said table to thereby advance said article-holding devices mounted thereon to a plurality of inspection stations, a scanning head at one of said inspecting stations; a unitary bundle of light transmitting fibers; means rotatably supporting said bundle in said scanning head with one end of said bundle being located in operative relationship to an article to be inspected; a bifurcated bundle of light-transmitting fibers fixedly supported in said scanning head with the free end of the unitary portion of said bifurcated bundle being located in light-communtating relationship to the other end of said unitary bundle, a light source in light-transmitting relationship to one leg of said bifurcated bundle, and a light-detecting device in light-receiving relationship to the other leg of said bundle; means for reciprocating said scanning head to move said unitary bundle into and out of operative relationship to an article of work at said inspection station; and means for rotating said scanning head during said operative relationship for scanning said article with said inspection end of said bundle.

References Cited

UNITED STATES PATENTS

| | | | |
|---|---|---|---|
| 3,068,739 | 12/1962 | Hicks et al. | 250—227 X |
| 3,305,689 | 2/1967 | Leavy et al. | 250—227 |
| 3,325,594 | 6/1967 | Goldhammer et al. | 250—227 X |
| 3,328,593 | 6/1967 | Johnson et al. | |
| 3,330,963 | 7/1967 | O'Connor | 250—227 |
| 3,349,906 | 10/1967 | Calhoun et al. | 250—227 X |
| 3,354,319 | 11/1967 | Loewen et al. | 250—227 |
| 3,384,235 | 5/1968 | Schulze et al. | 250—223 X |

ROBERT SEGAL, Primary Examiner

U.S. Cl. X.R.

209—111.7